(12) United States Patent
Chimento et al.

(10) Patent No.: US 11,050,352 B2
(45) Date of Patent: Jun. 29, 2021

(54) AC-TO-DC CONVERTER SYSTEM

(71) Applicant: ABB Schweiz AG, Baden (CH)

(72) Inventors: Filippo Chimento, Terranuova Bracciolini (IT); Mauro Piazzesi, Terranuova Bracciolini (IT)

(73) Assignee: ABB Schweiz AG, Baden (CH)

( * ) Notice: Subject to any disclaimer, the term of this patent is extended or adjusted under 35 U.S.C. 154(b) by 95 days.

(21) Appl. No.: 16/180,476

(22) Filed: Nov. 5, 2018

(65) Prior Publication Data

US 2019/0074775 A1   Mar. 7, 2019

Related U.S. Application Data

(63) Continuation of application No. PCT/EP2017/060628, filed on May 4, 2017.

(30) Foreign Application Priority Data

May 4, 2016 (EP) ..................................... 16168376

(51) Int. Cl.
*H02J 7/00* (2006.01)
*H02M 3/335* (2006.01)
(Continued)

(52) U.S. Cl.
CPC ........... *H02M 3/33569* (2013.01); *H02J 7/00* (2013.01); *H02J 7/022* (2013.01); *H02M 1/10* (2013.01);
(Continued)

(58) Field of Classification Search
USPC .................................................. 320/137, 140
See application file for complete search history.

(56) References Cited

U.S. PATENT DOCUMENTS 8,159,802 B2 * 4/2012 Tinsley, III ......... H02M 1/4216
361/93.8
8,503,208 B2   8/2013 Krause
(Continued)

FOREIGN PATENT DOCUMENTS

CN   201758356      3/2011
CN   202374190 U    8/2012
(Continued)

OTHER PUBLICATIONS

European Patent Office, International Search Report & Written Opinion issued in corresponding Application No. PCT/EP2017/060628, dated Jun. 7, 2017, 12 pp.
(Continued)

*Primary Examiner* — Samuel Berhanu
(74) *Attorney, Agent, or Firm* — Taft Stettinius & Hollister LLP

(57) ABSTRACT

A converter system for converting a three-phase or a single-phase AC voltage into a DC voltage, wherein the converter system includes three converter branches, each converter branch including a first input and a second input to be supplied with a single-phase AC voltage and a first output and a second output providing a DC voltage; wherein each converter branch includes an AC-to-DC stage and a DC-to-DC stage, which are connected between the first and second input and the first and second output; wherein the converter system is configured for interconnecting the first input of each converter branch with a phase of a three-phase grid and for interconnecting the first inputs of the converter branches with a phase of a single-phase grid; wherein the converter system is configured for interconnecting the second inputs, which are interconnected with each other, of the converter branches with a neutral point of the three-phase grid or the single-phase grid; and wherein the converter system
(Continued)

includes one or more controllers adapted for controlling the converter branches independently from each other.

18 Claims, 3 Drawing Sheets

(51) Int. Cl.
  *H02J 7/02* (2016.01)
  *H02M 1/42* (2007.01)
  *H02M 1/10* (2006.01)
  *H02M 7/23* (2006.01)
  *H02M 1/32* (2007.01)
  *H02M 1/00* (2006.01)

(52) U.S. Cl.
  CPC ........... *H02M 1/32* (2013.01); *H02M 1/4216* (2013.01); *H02M 1/4225* (2013.01); *H02M 7/23* (2013.01); *H02J 2207/20* (2020.01); *H02M 2001/007* (2013.01); *Y02B 40/00* (2013.01); *Y02B 70/10* (2013.01)

(56) References Cited

U.S. PATENT DOCUMENTS

| | | |
|---|---|---|
| 9,371,008 B2 | 6/2016 | Bouman |
| 9,577,513 B2 | 2/2017 | Feldtkeller et al. |
| 2006/0279350 A1 | 12/2006 | Zhang et al. |
| 2013/0215654 A1 | 8/2013 | Yan et al. |
| 2015/0014290 A1* | 1/2015 | Kooken ................ B23K 9/09 219/130.1 |
| 2015/0028796 A1* | 1/2015 | Nakayama ............ H01M 10/44 320/101 |

FOREIGN PATENT DOCUMENTS

| | | |
|---|---|---|
| CN | 102739032 A | 10/2012 |
| CN | 102790422 A | 11/2012 |
| CN | 102917909 A | 2/2013 |
| CN | 204030975 U | 12/2014 |
| EP | 1688203 | 8/2006 |
| EP | 1688203 A2 | 8/2006 |
| EP | 2869445 A1 | 5/2015 |
| WO | 2010086788 A2 | 8/2010 |
| WO | 2015076776 A1 | 5/2015 |

OTHER PUBLICATIONS

European Patent Office, Extended Search Report issued in corresponding Application No. 16168378, dated Dec. 1, 2016, 7 pp.
Phattanasak et al., "Paralleling of Single-phase AC/DC Converter with Power-Factor Correction," 35th Annual IEEE Power Electronics Specialists Conference, Aachen, Germany, 2004, pp. 1576-1580.
Arancibia et al., "A Unified Single- and Three-Phase Control for Grid Connected Electric Vehicles," IEEE Transactions on Smart Grid, vol. 4, No. 4, Dec. 2013, pp. 1780-1790.

* cited by examiner

AC-TO-DC CONVERTER SYSTEM

FIELD OF THE INVENTION

The invention relates to a converter system for converting a three-phase or a single-phase AC voltage into a DC voltage, a battery charger for charging batteries and to a use of a converter system for charging a battery.

BACKGROUND OF THE INVENTION

Due to the fast expansion of the electrical vehicle market, battery charging systems are required from domestic up to heavy duty power ranges (from few kW up to hundreds kW) and to be compatible with all the standards required in different countries.

Especially in the case of systems adapted for domestic charging, different standards apply to different areas of the world. For example, the Chinese and European AC standard has a 3-phase distribution grid with 380 and 400 V, respectively, while the US standard has a two-phase distribution grid of 200 to 240V.

A charging system that may be used in the worldwide market therefore may include the possibility of connection to the phases of both types of distribution grids.

For example, U.S. Pat. No. 8,503,208 B2 describes a converter for single-phase and three-phase operation, which may be used as a DC voltage supply and battery charger.

Furthermore, CN 202 374 190 U and CN 204030975 U relate to a single-phase and three-phase voltage power supply.

WO 2015/076 776 A1 relates to a multi-phase active power correction system with three subsystems that on an AC input side are connected to three phases and to a neutral point of a multi-phase system. Each subsystem comprises an active converter and a DC-to-DC converter.

DESCRIPTION OF THE INVENTION

It is an object of the invention to provide a worldwide usable electrical AC-to-DC converter, for example for a battery charging system, which does not have differently designed power electronic modules and/or different topologies to be used with different supply grids.

This objective is achieved by the subject-matter of the independent claims. Further exemplary embodiments are evident from the dependent claims and the following description.

A first aspect of the invention relates to a converter system for converting a three-phase or a single-phase AC voltage into a DC voltage. The converter system may be part of a battery charger, for example for domestic use. The three-phase voltage and/or the single phase voltage may be between 100 V and 500 V. The DC voltage may be used for charging a battery, for example a battery of an electrical vehicle and/or car.

According to an embodiment of the invention, the converter system comprises three converter branches, each converter branch comprising a first input and a second input to be supplied with an AC voltage and a first output and a second output providing a DC voltage. Each converter branch may comprise two inputs (i.e. the first and second input) and two outputs (i.e. the first and second output). Each converter branch may be designed to convert a single-phase AC voltage into a DC voltage. The single-phase DC voltage may be supplied to the first and second input. The DC voltage may be provided by the first and second output. All converter branches may be equally designed.

In a three-phase operation mode, in which the converter system may be connected to a three-phase grid, the different inputs may be connected to the different phases of the three-phase grid.

In a single-phase operation mode, in which the converter system may be connected to a single-phase grid, the three first inputs may be all interconnected with each other and with the one phase of the single phase grid.

The three second inputs all may be connected with a neutral phase of the three or single phase-grid.

Each converter branch comprises an AC-to-DC stage and a DC-to-DC stage, which are connected between the first and second input and the first and second output.

The AC-to-DC stage and the DC-to-DC stage may be electric devices with power semiconductors, which may be controlled by one or more controllers of the converter system. An AC-to-DC stage may be adapted for converting a single phase AC voltage into an intermediate DC voltage. In the three-phase operation mode, every AC-to-DC stage may convert a different phase of the three-phase grid into an intermediate voltage. In the single-phase operation mode, all AC-to-DC stages may convert ⅓ power of the single phase of the single-phase grid.

A DC-to-DC stage may be adapted for converting the intermediate DC voltage into the DC voltage provided at the outputs of the respective converter branch.

The converter system is configured for interconnecting the first input of each converter branch with a phase of a three-phase grid and for interconnecting the first inputs of the converter branches with a phase of a single-phase grid. The first inputs may be star-connected with each other in this case. Furthermore, the converter system is configured for interconnecting the connected second inputs of the converter branches with a neutral point of the three-phase grid or single-phase grid. The second inputs may be star-connected with each other. Thus, the converter system provides the possibility to be supplied by either a single-phase or three-phase AC source, such as an electrical grid. In the case of a three-phase grid, the phases may be phase-shifted with respect to each other by 120.degree. and the converter branches processes the phase-shifted voltages of the phases. In the case of a single-phase grid, the one phase is distributed equally among the converter branches, which all process a voltage without a phase shift.

Furthermore, the converter system comprises one or more controllers adapted for controlling the converter branches independently from each other. Independent control in this context may mean that measurement values collected in one branch are not used for controlling another branch. In other words, only measurement values collected in a branch are used for controlling this converter branch.

Since the converter branches are controlled independently from each other, the same control scheme may be used in the single-phase operation mode and in the three-phase operation mode. For example, every converter branch may be controlled based on the phase shift provided by the voltage, which is input to the respective converter branch, and/or on the power supplied to the converter branch.

It has to be noted that the converter system may comprise a central controller that controls the converter branches independently from each other or that every converter branch comprises an independent controller of its own. It also may be that a central controller and branch controllers of the converter branches share the independent control.

According to an embodiment of the invention, the one or more controllers are adapted for controlling the AC-to-DC stage and the DC-to-DC stage of a converter branch independently from the AC-to-DC stage and the DC-to-DC stage of another converter branch. It may be that the AC-to-DC stage and the DC-to-DC stage of one converter branch are not controlled independently from each other. It may be that control signals and/or measurement values are exchanged between the AC-to-DC stage and the DC-to-DC stage.

The AC-to-DC stage may be seen as an input stage and the DC-to-DC stage may be seen as an output stage of the converter branch. The output stages are then supplied either by the three input stages in parallel, which input stages operate either in a three-phase mode or in a phase-to-phase mode.

In general, the topology of the converter system is able to comply with standards coming from different countries and regions. No switching elements have to be used to switch between different operation modes. In particular, no intermediate switching elements between the input stages and the output stages of the converter branches have to be provided.

In a country with a three-phase standard, the converter system may be connected with its inputs to the three phases of the electrical grid. In a country with single-phase standard, the converter system may be connected with all its inputs to the one phase of the electrical grid. In any case, all three converter branches may be used for converting the AC input voltage into a DC output voltage, which may be used for charging a battery.

The topology and control may allow the use of the single phase or the three-phase input with the same functionality. All devices of all converter branches arc used in either operation mode.

It even may be the case that the converter system is provided in a cabinet, which provides the three-phase and the single-phase input. The converter system may be installed with the cabinet and connected to the respective grid without any modification (topology and/or control) of the interior of the cabinet.

The rectifier and the power factor corrector of a converter branch may be seen as an input stage of the converter branch.

According to an embodiment of the invention, the AC-to-DC stage comprises a rectifier. A rectifier may be a device adapted for converting an AC voltage into a variable voltage only having positive leading sign.

Furthermore, the AC-to-DC stage may comprise a power factor corrector. A power factor corrector may be a device adapted for providing a higher power factor between its input voltage and input current as between its output voltage and output current.

In general, the AC-to-DC stage may be based on any topology, such as a multiphase topology, a bridgeless topology, a totem pole topology, a totem pole multiphase topology, etc.

The DC-to-DC stage may comprise a DC-to-DC converter, which may be adapted for transforming a first DC current of a first DC voltage into a second DC current of a second DC voltage.

The rectifier, power factor corrector and DC-to-DC converter may be cascade-connected in this order, i.e. the respective outputs of a previous device are connected with the input of the following device.

According to an embodiment of the invention, the rectifier is a passive rectifier, such as a bridge rectifier, which may comprise two anti-parallel diode bridges. Alternatively, the rectifier may be an active rectifier, i.e. a controlled rectifier.

According to an embodiment of the invention, each converter branch comprises an electrical filter, for example cascade-connected between the first and second input and the rectifier. The electrical filter may be an input EMI filter adapted for suppressing harmonic disturbances. The EMI filter may be designed to suppress harmonic disturbances generated in either three-phase or single-phase operation.

According to an embodiment of the invention, each converter branch comprises an inrush current protector, which may be cascade-connected between the first and second input and the rectifier. The inrush current protector may be a device adapted for disconnecting the respective branch from one or both inputs, when a current in the converter branch is becoming too high. The inrush current protector may comprise a relay.

According to an embodiment of the invention, the power factor corrector comprises a boost converter, in particular a boost step up converter. The power factor corrector may be an active converter and/or may be adapted for current shaping in phase with the grid voltage.

According to an embodiment of the invention, the power factor corrector comprises at least two corrector branches. For example, the power factor corrector comprises two, three or more boost converters, which are interleaved with each other.

According to an embodiment of the invention, each converter branch comprises a DC link, which is cascade-connected between the AC-to-DC stage and the DC-to-DC stage. The DC link may comprise one or more capacitors connected in parallel between the inputs and outputs of the DC link.

According to an embodiment of the invention, the DC-to-DC stage comprises an isolated converter, which, for example, may comprise a galvanically separating transformer. The design and/or control of DC-to-DC stage may be realized to achieve the desired output voltage level and/or to comply with the requirement of the battery charging protocols, when the converter system is used for charging a battery.

However, it also may be possible that the DC-to-DC stage comprises a not-isolated converter, such as a further boost converter.

In general, the DC-to-DC stage may be based on any topology, such as a resonant topology, a quasi resonant topology, a phase shift topology, etc.

According to an embodiment of the invention, the DC-to-DC stage and/or the DC-to-DC converter comprises an inverter, a transformer and a rectifier, which are cascade-connected. The inverter may be an active inverter adapted for converting a DC voltage from the DC link into an AC voltage to be supplied to the transformer. The rectifier may be a passive rectifier.

According to an embodiment of the invention, the DC-to-DC stages are connected in parallel at their output. In other words, all first outputs may be connected with each other and all second outputs may be connected with each other.

According to an embodiment of the invention, the DC-to-DC stages are connected in series at their output. The first output of one DC-to-DC stage may be connected with the second output of a further DC-to-DC stage.

With respect to the control of the active components, such as the power factor corrector and the DC-to-DC converter, the three-phase or single-phase, i.e. phase-to-phase, operation mode may be realized by one or more controllers automatically adapted to process a 120.degree. input phase shift of three phases or to process three synchronized phases at the input stage. In other words, the control scheme may not have been switched dependent on whether the converter system is connected to a three-phase or a single-phase grid.

According to an embodiment of the invention, the one or more controllers are adapted for controlling the AC-to-DC stage and/or the power factor corrector independently from each other and/or independently from the DC-to-DC converters. A controller or controllers, which control the power factor correctors only may control a power factor corrector based on measurements in the respective converter branch or in particular in the respective power factor corrector.

For example, the input stage, i.e. the rectifier and the power factor corrector of each converter branch may work independently from the other converter branches in both operation modes, i.e. three-phase or single-phase operation mode. In such a way, the input stage may rebuild the input AC voltage with a proper harmonic content, as may be demanded by the standard requirements of the respective electrical grid. The control of the output voltage of the voltage factor corrector may be independent for the three converter branches and/or may only have the role of maintaining the voltage level within certain margins.

According to an embodiment of the invention, the one or more controllers are adapted for controlling the DC-to-DC stages independently from each other and/or independently from the AC-to-DC stages. In particular, the one or more controllers may control an inverter of the DC-to-DC stage. In other words, a controller or controllers, which control the DC-to-DC stages, only may control a DC-to-DC stage based on measurements in the respective converter branch or in particular in the respective DC-to-DC stage.

A further aspect of the invention relates to a battery charger for charging batteries comprising a converter system, as described in the above and in the following. For example, the battery charger may be used for charging vehicle batteries.

A further aspect of the invention relates to a use of a converter system, as described in the above and in the following, for charging a battery, such as a vehicle battery. The converter system may be used in any country independently of the number of phases of the standard electrical grid.

These and other aspects of the invention will be apparent from and elucidated with reference to the embodiments described hereinafter.

BRIEF DESCRIPTION OF THE DRAWINGS

The subject-matter of the invention will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
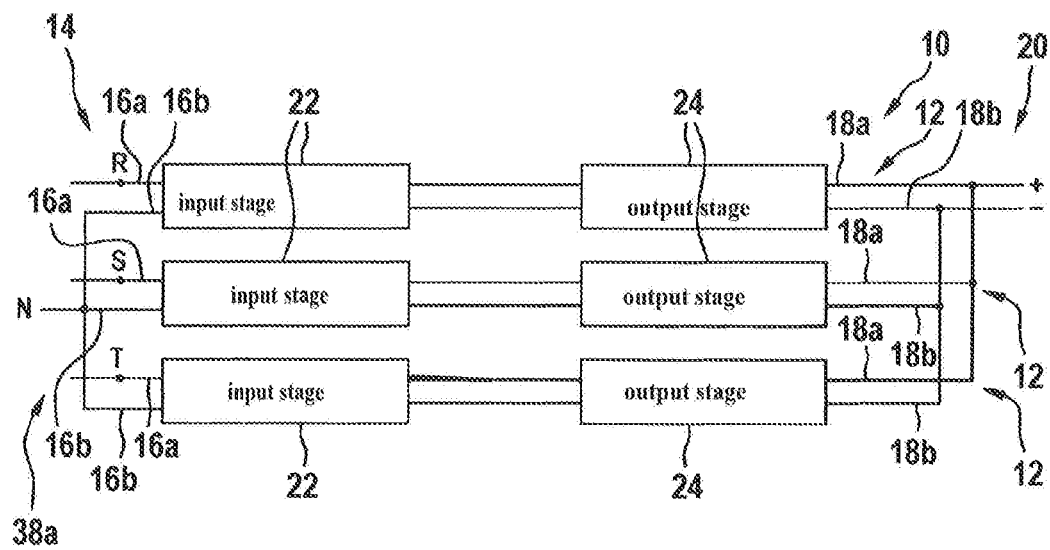
FIG. 1 schematically shows a converter system according to an embodiment of the invention.

FIG. 1 shows a converter system 10 comprising three converter branches 12. At the side of the AC input 14 of the converter system 10, each converter branch 12 comprises a first input 16a, i.e. R, T and S, and a second input 16b. The second inputs 16b of the converter branches 12 are star-connected and are used for connecting the converter system 10 to a neutral phase N. At the output side, each converter branch 12 comprises a first output 18a and a second output 18b, each of which may be connected in parallel to provide a DC output 20 of the converter system 10. The converter system 10 may be used to charge a battery, which may be connected to the Dc output 20.

The outputs 18a, 18b of each converter branch 12 may be connected in parallel (as shown), wherein each converter branch 12 provides ⅓ of the total rated power of the system 10. The outputs 18a, 18b also may be connected in series to provide ⅓ of the rated voltage.

Each branch comprises an input stage 22 or AC-to-DC stage 22 connected to the inputs 16a, 16b and an output stage 24 or Dc-to-DC stage 24 connected to the outputs 18a, 18b. The input stage 22 is adapted for transforming a single-phase AC voltage provided at the inputs 16a, 16b into a DC voltage. The output stage 24, which mainly comprises a DC-to-DC converter 26, converts the DC voltage from the input stage 22 into the output DC voltage and/or may provide a galvanic isolation of the respective converter branch 12.

It also may be possible that output stages 24 are interconnected in an interleaved way, for example, may be connected in series at the input side with the input stages 22.

Figure 2:
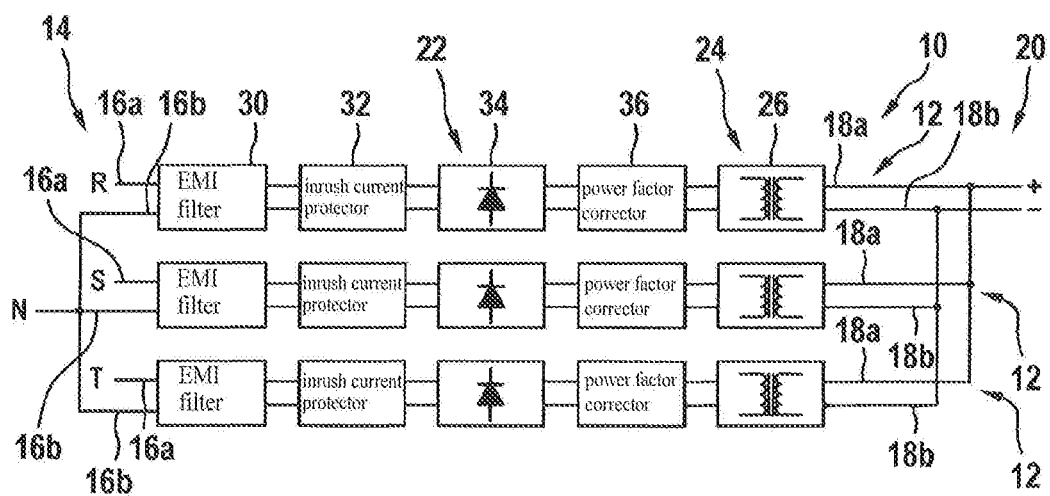
FIG. 2 schematically shows a converter system according to a further embodiment of the invention.

FIG. 2 shows a further embodiment of a converter system 10. In FIG. 2 and the following figures, the reference numerals of the components of a converter branch 12 are only shown for one converter branch 12. However, all converter branches 12 and/or their components may be equally designed.

The input stage 22 of each converter branch 12 comprises an EMI filter 30, an inrush current protector 32, a rectifier 34 and a power factor corrector 36. The components 30, 32, 34, 36, 26 of each converter branch 12 may be cascade-connected in this order between the inputs 16a, 16b and the outputs 18a, 18b.

Figure 3:
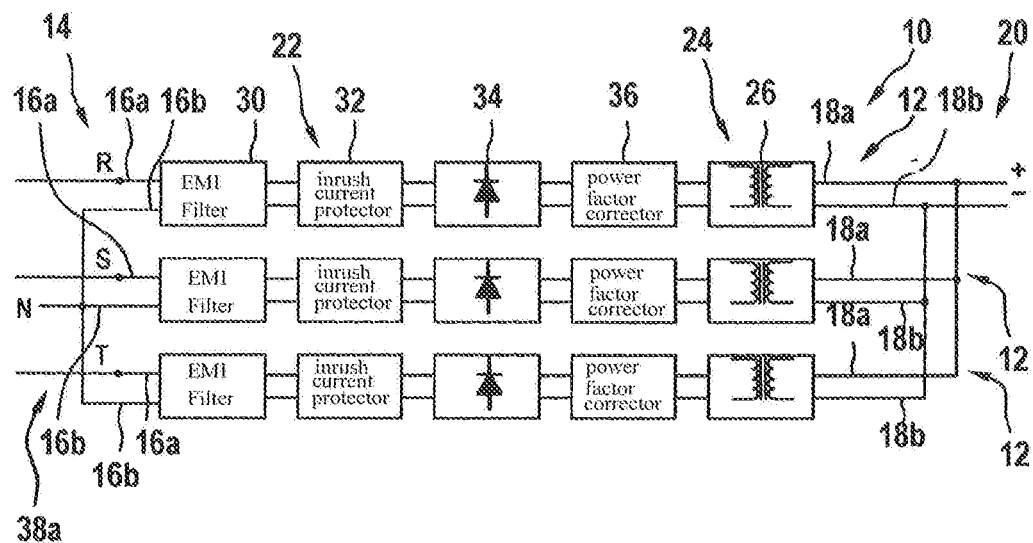
FIG. 3 shows the converter system of FIG. 2 interconnected with a three-phase grid.
Figure 4:
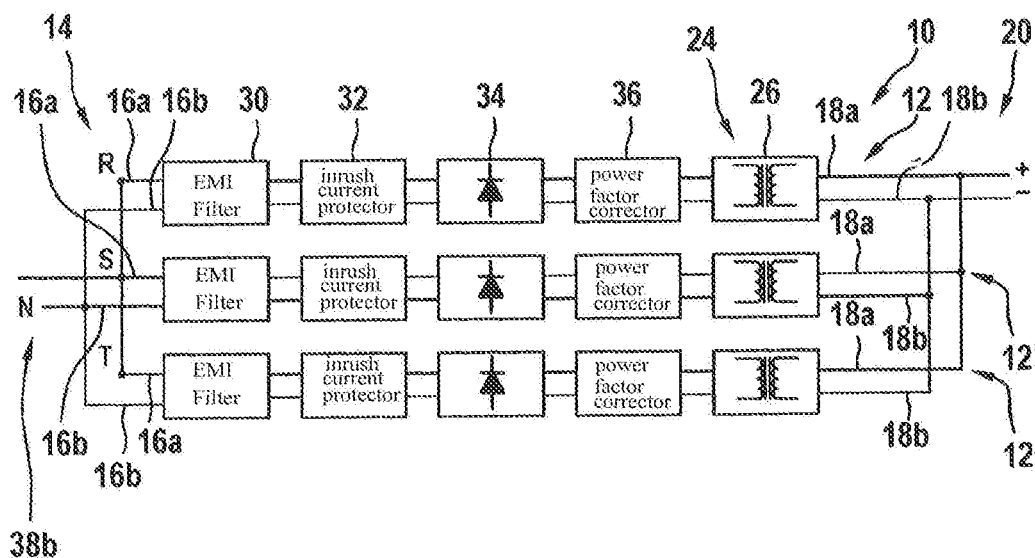
FIG. 4 shows the converter system of FIG. 2 interconnected with a single-phase grid.

As shown in FIGS. 3 and 4, the topology of the converter system 10 is configured to be connected to a three-phase grid 38a or a single-phase grid 38b without the need for any contractual modification of the converter system 10 and/or switching between operation modes.

In the case of FIG. 3, the converter system 10 is connected to a three-phase grid 38a. Each input 16a of each converter branch 12, i.e. R, S, T, is connected to another phase of the grid. The other inputs 18b all may be connected to a neutral point of the grid 38a. The converter branches 12 are processing three AC voltages, which are phase-shifted by 120.degree. with each other. In FIG. 1, the converter system 10 is also connected to a three-phase grid 38a.

In the case of FIG. 4, the inputs 16a arc star-connected with each other and connected to the phase of the single-phase grid 38b. The converter branches 12 arc processing all ⅓ of the power of the single. It is important to note that in both operation modes (three-phase or singe-phase), all converter branches 12 and/or all components of the converter branches 12, such as the input stages 22 and the output stages 24, may process the same amount of power, i.e. the power is equally distributed between the branches.

Figure 5:
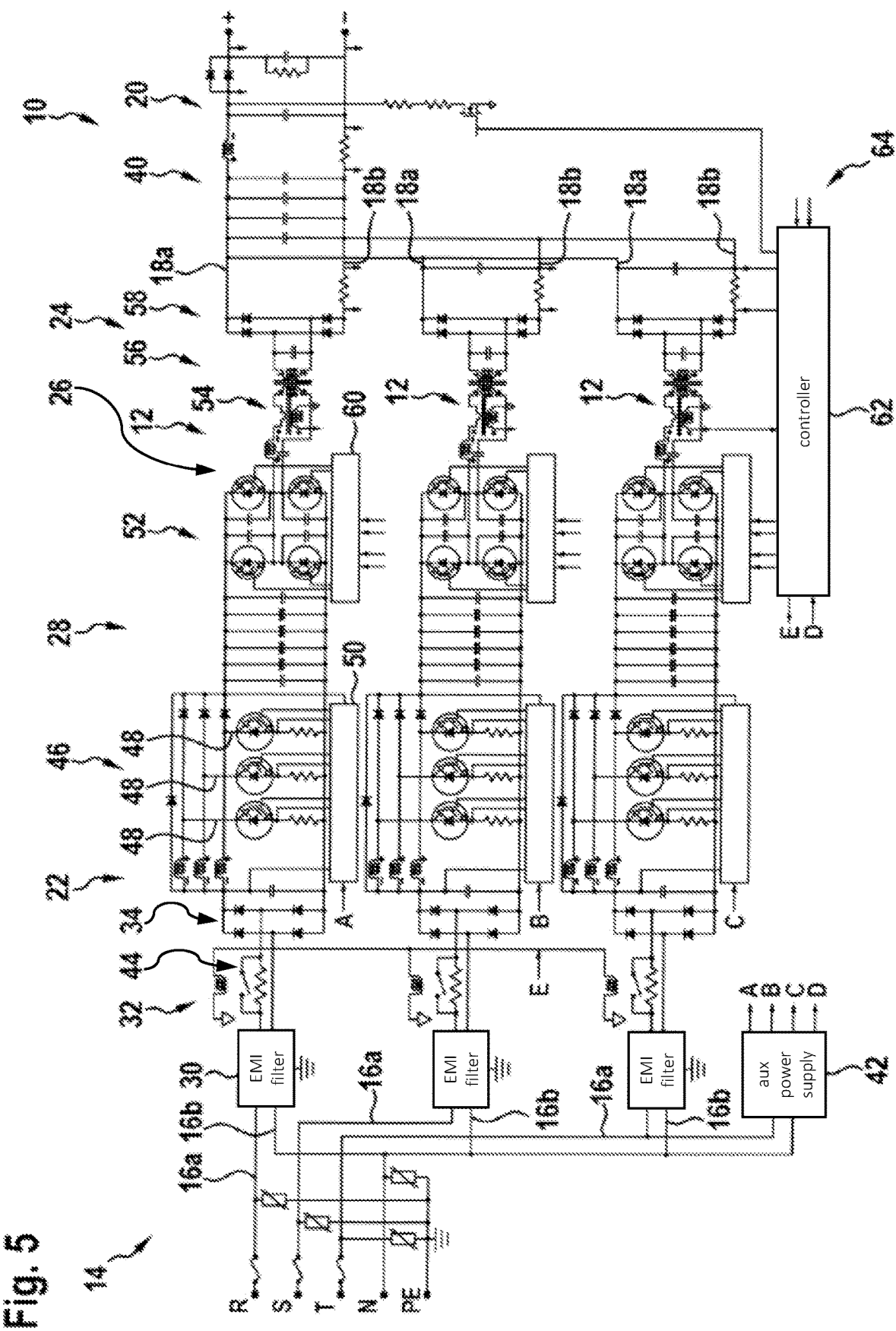
FIG. 5 shows a converter system according to an embodiment of the invention.

FIG. 5 shows a more concrete realization of the converter system 10. The input stage 22 and the output stage 24 of each converter branch may be interconnected by a DC link 28. A further DC link 40 may be provided for the outputs of the converter system 10 at the output side 20.

The AC inputs 16a, R, S, T and the neutral point input N may be all interconnected with varistors with a grounding input PE, such that overvoltages at the input 14 may be mitigated.

The converter system 10 may comprise an auxiliary power supply 42, which is supplied by one of the inputs 16a, T and also connected to the neutral point N.

The inrush current protection comprises a relay 44, which may be opened for current protection of the components of each branch 12.

The rectifier 34 may be a passive diode rectifier, comprising two half-bridges of diodes.

The power factor corrector may be realized as a boost step up converter 46, which may comprise two, three or more branches 48, each of which comprises an inductivity and a diode connected in series between an input and an output of the power factor corrector and a semiconductor switch connected between the inductivity and the diode on the one side and to the other input and output of the power factor corrector an the other side. In general, the power factor corrector may be composed by a single branch or multiple branches 48, for example in parallel.

Each of the power factor correctors may comprise a controller 50, which may be supplied with power by the auxiliary power supply 42.

The DC-to-DC converter 26 comprises an inverter 52, a resonant bridge 54, a transformer 56 and a rectifier 58, which are connected in this order between the DC link 28 and the outputs 18a, 18b of the respective converter branch 12.

The inverter 52 may be a two-point inverter comprising two half-bridges with semiconductor switches, which are controlled by a gate driver 60. Each inverter 60 comprises one of these gate drivers 60.

The rectifier 58 may be a passive rectifier comprising two diode half-bridges.

The gate drivers 60 may be controlled by a controller 62, which may also be supplied with power by the auxiliary power supply 42. The controller 62 also may control the relays 44 and/or may be connected with a CAN bus 64. It has to be noted that the central controller 62 may be replaced with branch controllers, i.e. a controller for each converter branch 12.

In the controllers 50, 62, control schemes may be implemented, such that the power factor correctors 36 and the DC-to-DC converters 26 all may be controlled independently from each other. In such a way, in every operation mode, the same control strategy is applied.

The controller 62, which may be based on a DSP, measures for each branch a current in the output 18b and/or a current in the system output 20. The output current of each converter branch 12 may be controlled independently for the three converter branches 12 and/or the controller 62 may maintain these three currents equal. Corresponding gate signals may be generated by the controller 62 and sent to the gate drivers 60. Furthermore, the controller may measure for each converter branch 12 the current in the LC resonant DC/DC bridge 54 and may also use these measurements for independently controlling the inverters 52.

The main control strategy of the controller 62 may be based on the feedback of the output DC voltage and/or current. The DC output voltage is common for the three converter branches 12, when they are connected in parallel after the rectifiers 58. A control loop may be processed by the controller 62 in order to maintain the DC output within the required output ranges. A main control loop that is responsible for the equal power sharing of the three converter branches 12 may be based on the DC current output control.

When the converter branches are controlled based on power sharing among the converter branches 12, the operation of the converter system 10 may be independent from being supplied by a single-phase grid 38b or a three-phase grid 38a.

The controller 62 also may control the inrush current protectors 32 by providing a common switching signal E for the relays 44.

Each of the controllers 50 measure a voltage at the respective input of the power factor corrector 36 and/or a current through the semiconductor switches of the branches 48. Based on these measurements, signals for the semiconductor switches are generated, independently for each power factor corrector. In general, different control schemes may be implemented in the controllers 50 to minimize a voltage ripple of the output voltage of the input stage 22, for example by implementing a synchronizing method targeted to minimize the total harmonic distortion in the input voltage and current.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 converter system
12 converter branch
14 AC input of system
16a first AC input of branch
16b second AC input of branch
18a first AC input of branch
18b second AC input of branch
20 DC output of system
R, S, T system input
N neutral point input
PE grounding input
22 input stage/AC-to-DC stage
24 output stage/DC-to-DC stage
26 DC-to-DC converter
28 DC link
30 EMI filter
32 inrush current protector
34 rectifier
36 power factor corrector
38a three-phase grid
38b single-phase grid
40 output DC link
42 auxiliary power supply
44 relay 46 boost step up converter
48 branch of boost step up converter
50 controller of boost step up converter
52 inverter
54 resonant bridge
56 transformer
58 rectifier
60 gate driver
62 controller
64 CAN bus

The invention claimed is:

1. A converter system for converting a three-phase or a single-phase AC voltage into a DC voltage;
    wherein the converter system comprises three converter branches, each converter branch comprising a first input and a second input to be supplied with a single-phase AC voltage and a first output and a second output providing a DC voltage;
    wherein each converter branch comprises an AC-to-DC stage and a DC-to-DC stage, which are connected between the first and second input and the first and second output;
    wherein each AC-to-DC stage comprises a power factor corrector with a boost converter, which comprises at least two corrector branches each of which comprises an inductivity and a diode connected in series between an input and an output of the power factor corrector and a semiconductor switch connected between the inductivity and the diode on one side and to another input and output of the power factor corrector on another side;
    wherein the converter system is configured for interconnecting the first input of each converter branch with a phase of a three-phase grid and for interconnecting the first input of the converter branches with a phase of a single-phase grid; and
    wherein the converter system is configured for interconnecting the second inputs, which are interconnected with each other, of the converter branches with a neutral point of the three-phase grid or the single-phase grid;
    wherein the converter system comprises one or more controllers adapted for controlling the converter branches independently from each other.

2. The converter system of claim 1,
    wherein the one or more controllers are adapted for controlling the AC-to-DC stage and the DC-to-DC stage of a converter branch independently from the AC-to-DC stage and the DC-to-DC stage of another converter branch.

3. The converter system of claim 1,
    wherein each AC-to-DC stage comprises a passive rectifier or active rectifier.

4. The converter system of claim 1,
    wherein each AC-to-DC stage comprises an electrical filter connected to the first and second input.

5. The converter system according to according to claim 1,
    wherein each AC-to-DC stage comprises an inrush current protector.

6. The converter system according to claim 1,
    wherein each converter branch comprises a DC link, which is connected between the AC-to-DC stage and the DC-to-DC stage.

7. The converter system according to claim 1,
    wherein the DC-to-DC converter comprises an isolated DC-to-DC converter.

8. The converter system according to claim 1,
    wherein the DC-to-DC stage comprises an inverter, a transformer and a rectifier, which are cascade-connected.

9. The converter system according to claim 1,
    wherein the DC-to-DC stages are connected in parallel at their outputs.

10. The converter system according to claim 1,
    wherein the DC-to-DC converters are connected in series at their outputs.

11. The converter system according to claim 1,
    wherein the one or more controllers are adapted for controlling the AC-to-DC stages independently from each other and/or the DC-to-DC stages; and/or
    wherein the one or more controllers are adapted for controlling the DC-to-DC stages independently from each other and/or the AC-to-AC stages.

12. A battery charger for charging batteries comprising a converter system according to claim 1.

13. The converter system of claim 2, wherein each AC-to-DC stage comprises a passive rectifier or active rectifier.

14. The converter system of claim 2, wherein each AC-to-DC stage comprises an electrical filter connected to the first and second input.

15. The converter system of claim 3, wherein each AC-to-DC stage comprises an electrical filter connected to the first and second input.

16. The converter system according to according to claim 2, wherein each AC-to-DC stage comprises an inrush current protector.

17. The converter system according to according to claim 3, wherein each AC-to-DC stage comprises an inrush current protector.

18. The converter system according to according to claim 4, wherein each AC-to-DC stage comprises an inrush current protector.

* * * * *